(12) United States Patent
Yonemura et al.

(10) Patent No.: US 6,181,521 B1
(45) Date of Patent: Jan. 30, 2001

(54) METHOD OF ASSEMBLING MAGNETIC HEAD SLIDER AND MAGNETIC STORAGE DEVICE

(75) Inventors: Shinji Yonemura, Odawara; Hiromitsu Tokisue, Niihari-gun; Hideaki Tanaka, Odawara, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/071,119

(22) Filed: May 4, 1998

(30) Foreign Application Priority Data

May 8, 1997 (JP) .................................................... 9-118449

(51) Int. Cl.$^7$ ........................................................ G11B 5/48
(52) U.S. Cl. ............................................................ 360/244.8
(58) Field of Search ...................................... 360/103, 104

(56) References Cited

U.S. PATENT DOCUMENTS 5,561,570 * 10/1996 Gill et al. ............................... 360/104
5,657,187 * 8/1997 Hatch et al. ........................... 360/104
5,898,543 * 4/1999 Jagt et al. .............................. 360/104

FOREIGN PATENT DOCUMENTS 2-192082   7/1990 (JP) .
7-226042   8/1995 (JP) .

OTHER PUBLICATIONS

Priprints from the 7th NORDRIB '96, vol. III, Bergen 1995, "Coupling and Nonlinear Effects of Cantilever Deflection and Torsion Encountered in Simultaneous Measurement of Vertical and Lateral Forces Using Scanning Probe Method", Y. Mitsuya et al, pp. 41–46.

* cited by examiner

Primary Examiner—Allen T. Cao
(74) Attorney, Agent, or Firm—Mattingly, Stanger & Malur, P.C.

(57) ABSTRACT

In order to prevent an occurrence of troubles such as abnormal wear, a self-excited vibration and a forced vibration caused by a friction force in a contact type magnetic head slider, a load beam, which is supported on a proximal end thereof by an actuator, at a distal end of which a magnetic head slider mounting a magnetic head is fixed, and which is for bringing the magnetic head slider into contact with a recording surface of a rotating magnetic disk by a desired load, is curved convexly on the side of the magnetic disk when an assembly is completed. Thus, a center of rotation in a slider pitch direction due to a friction force between the magnetic head slider and the magnetic disk can be positioned below the recording surface of the magnetic disk. In the magnetic head slider, when a friction force is generated, a pitch angle is not changed or a flying height on the heading edge side becomes higher, whereby it is possible to suppress edge wear on the leading edge side, the self-excited vibration and the forced vibration of the suspension due to the varying friction force.

8 Claims, 8 Drawing Sheets

CHANGE IN SLIDER PITCH ANGLE TO FRICTION FORCE WHEN CURVATURE OF LOAD BEAM IS DEFINED AS PARAMETER

FIG. 7

CHANGE IN SLIDER PITCH ANGLE TO CURVATURE WHEN CURVATURE OF LOAD BEAM IS DEFINED AS PARAMETER

FIG. 8 CHANGE IN SLIDER PITCH ANGLE TO FRICTION FORCE WHEN SPRING LOAD IS DEFINED AS PARAMETER

FIG. 9 CHANGE IN SLIDER PITCH ANGLE TO SPRING LOAD WHEN SPRING LOAD IS DEFINED AS PARAMETER

METHOD OF ASSEMBLING MAGNETIC HEAD SLIDER AND MAGNETIC STORAGE DEVICE

BACKGROUND OF THE INVENTION

1. Field of the Invention

The present invention relates to a technique for assembling a magnetic head slider and a magnetic storage device. More specifically, it relates to a technique which is effective for an application to a magnetic disk device or the like having a contact type magnetic head slider.

2. Description of the Related Art

In an information processing field, a magnetic storage device including a rotational type storage medium is widely used as an external storage device or the like, and there is a great need to reduce its size and to increase its capacity.

For example, in a magnetic disk device including a magnetic disk as the rotational type storage medium, the smaller a space between the rotating magnetic disk and a magnetic head slider mounting a magnetic head for recording/reproducing information on this magnetic disk becomes, the higher the areal density capable of recording/reproducing the information on the magnetic disk which is a recording medium becomes. Thus, the space between the magnetic head slider and the magnetic disk becomes increasingly smaller. The present space between the magnetic head slider and the magnetic disk is less than 100 nm, and a the magnetic disk device having a space of 50 nm or less is also appearing on the market. Thus, a mainstream of the magnetic disk is a sputtering disk on which a magnetic material layer is formed by a sputtering process, thereby improving smoothness on a surface of the magnetic disk.

In order to further increase the areal density, the space between the magnetic head slider and the magnetic disk is further reduced, thereby also developing a contact recording form in which the magnetic head slider and the magnetic disk make contact intermittently with each other or are always in contact with each other.

Unlike a conventional flying type magnetic head slider, the contact recording requires a, resistance to wear due to a contact with the magnetic disk and a low friction force for keeping constant the space between the magnetic head and the magnetic disk. More specifically, assuming that a flying height of the conventional magnetic head slider is reduced and the head slider with reduced air bearing height is used for the contact recording, when the friction force is applied between the magnetic head slider and the magnetic disk, it is considered that a pitch angle of the magnetic head slider is reduced and thus the friction force is applied to a leading edge side of the magnetic head slider. The pitch angle is defined to be positive at the time of the high flying height on a leading edge of the magnetic head slider, while it is defined to be negative at the time of the high flying height on a trailing edge of the magnetic head slider. A reduction of the pitch angle allows the leading edge of the magnetic head slider to come into contact with the magnetic disk, whereby the friction force becomes still larger and thus a self-excited vibration of a suspension is generated. Furthermore, when a friction coefficient within the magnetic disk surface has a distribution, a forced vibration of the suspension is generated due to a variation in the friction force. Therefore, there is a technical problem in which the space between the magnetic head and the magnetic disk cannot be constantly kept and a stable magnetic recording is thus difficult.

As a method for solving this technical problem, an RCC (Remote Centered Compliance) mechanism is disclosed in Japanese Patent Unexamined Application No. 2-192082, for example. That is, this mechanism is constituted so that the front and rear portions of the magnetic head in a direction of rotation of the medium may be supported by a pair of front and rear inclined plates forming an inverted trapezoid with respect to the magnetic disk surface, an intersection of extending lines of the plates being at a height of the magnetic disk surface or lower. By the use of this mechanism, since the pitch angle is increased when the friction force is applied, an increase of the friction force can be prevented, and the self-excited vibration and forced vibration of the suspension can be suppressed. However, there is another technical problem in which, since this mechanism is complicated in structure, it is difficult to apply this method to the magnetic disk device.

In another publication, Y. Mitsuya, Y. Ohshima and T. Nonogaki, "Coupling and Nonlinear Effects of Cantilever Deflection and Torsion Encountered in Simultaneous Measurement of Vertical and Lateral Forces using a Scanning Probe Method", Proceedings of the 7th NORDTRIB '96, Vol. 3, for example. As regards a probe suspension of a probe microscope, a relationship between the force applied to a probe chip supported by the end of the cantilever in a direction perpendicular to the surface to be scanned and the force applied to the probe chip horizontally in a direction of the side surface of the cantilever is quantitatively analyzed by a method such as a finite element method. As a result, the publication merely proves an existence of an "optimum condition" in which, when the cantilever is deflected due to an application of the vertical force of a specific value to the cantilever, the cantilever is not distorted even if the lateral force is applied to the probe chip, the vertical and lateral forces are not correlated with each other, linearity is excellent and the simultaneous measurement of the vertical and lateral forces is allowed to be possible. The publication does not take into consideration the above technical problems to be solved by the present invention at all.

Thus, the above-described prior art cannot solve the technical problem described below. That is, when the friction force is applied between the magnetic disk and the magnetic head slider, the pitch angle of the magnetic head slider is reduced, whereby, owing to an edge wear on the leading edge side of the magnetic head slider due to the increase of the friction force, owing to a generation of the self-excited vibration of the suspension and owing to the generation of the forced vibration of the suspension due to the varying friction force, the space between the magnetic head and the magnetic disk cannot be constantly kept, and thus stable magnetic recording is difficult.

SUMMARY OF THE INVENTION

It is an object of the present invention to provide a technique for assembling a head slider capable of preventing a trouble such as abnormal wear, a self-excited vibration and a forced vibration due to a friction of a contact type head slider and a rotational type storage medium, without complicating the suspension in structure and increasing the suspension in size.

It is another object of the present invention to provide a technique for assembling a head slider capable of constantly keeping a positional relationship between a transducer mounted in the contact type head slider and the rotational type storage medium and of achieving an improvement of real density and reliability without an influence of the friction of the contact type head slider and the rotational type storage medium.

It is a still another object of the present invention to provide a magnetic storage device capable of preventing the trouble such as the abnormal wear, the self-excited vibration and the forced vibration due to the friction of the contact type head slider and the rotational type storage medium without complicating the suspension in structure and increasing the suspension in size.

It is a further object of the present invention to provide a magnetic storage device capable of constantly keeping the positional relationship between the transducer mounted in the contact type head slider and the rotational type storage medium and of achieving the improvement of areal density and reliability without the influence of the friction of the contact type head slider and the rotational type storage medium.

The present invention is characterized by that, in a constitution including a contact type head slider which is supported by a positioning mechanism through a load beam and positioned in a state that it may be in contact with a rotational type storage medium, wherein the head slider is installed so that a pitch angle may be changed due to a torsion about an axis of a straight line connecting a mounting position of the load beam to the positioning mechanism and a mounting position of the load beam to the head slider; and the load beam is curved or bent so that it may be convex with respect to a surface of the rotational type storage medium.

By this curvature or bend of the load beam, a center of rotation of a head slider due to a friction force between the head slider and the rotational type storage medium in a direction of pitch of the head slider is located below or on the opposite side of a contact surface of the rotational type storage medium. Therefore, the pitch angle of the head slider is not changed due to the moment generated by the friction force between the head slider and the rotational type storage medium, or the pitch angle is increased so that the increase of the friction force may be canceled. This ensures that it is possible to prevent the trouble such as the abnormal wear, the self-excited vibration and the forced vibration of the head slider due to the friction of the head slider and the rotational type storage medium. Therefore, the positional relationship between the transducer mounted in the head slider and the rotational type storage medium is not influenced by the generation of the friction force but is constantly kept, whereby it is possible to achieve the improvement of the areal density of information on the rotational type storage medium, and the improvement of reliability of operation due to a stabilization of recording/reproducing operation or the like.

DETAILED DESCRIPTION OF THE PREFERRED EMBODIMENTS

Embodiments of the present invention will be described below in detail with reference to the accompanying drawings.

In the following description, a magnetic head slider and a magnetic disk device are describe as examples of a head slider and a magnetic storage device, respectively.

First, the constitution of the magnetic disk device of an embodiment according to the present invention will be described with reference to FIG. 10. In the constitution shown in FIG. 10, there is illustratively shown the use of a rotary type actuator as a positioning mechanism.

In an enclosed space defined by a base 10 and a cover 11, a plurality of magnetic disks 2 are fixed by a common spindle 12 so that they may be coaxially located at a predetermined spacing and parallel to each other. Each of a plurality of magnetic head slider 3, which are individually held by the end of a load beam 1 whose proximal end is supported by the end of an actuator 6, is arranged on one of a plurality of recording surfaces 2a of the magnetic disks 2, respectively, so that it may come into contact with one of the recording surfaces 2a by a predetermined load. The actuator 6 is swung around a pivot shaft 6a and driven by a voice coil motor 13 comprising a voice coil 13a and a yoke 13b such as a permanent magnet.

That is, by controlling a direction and an electric current flowing through the voice coil 13a of the voice coil motor 13, the actuator 6 makes a swing motion, whose swing direction, velocity and angle are controlled, within a plane parallel to the magnetic disk 2. By this swing motion, the load beam 1 and the magnetic head slider 3 supported by the end of the load beam 1 are moved on the recording surface 2a of the magnetic disk 2 in a radial direction of the magnetic disk 2. For example, they make a movement (seek) among a plurality of tracks concentrically arranged on the recording surface 2a of the magnetic disk 2 and take action (following) for following a specific track.

Figure 1:
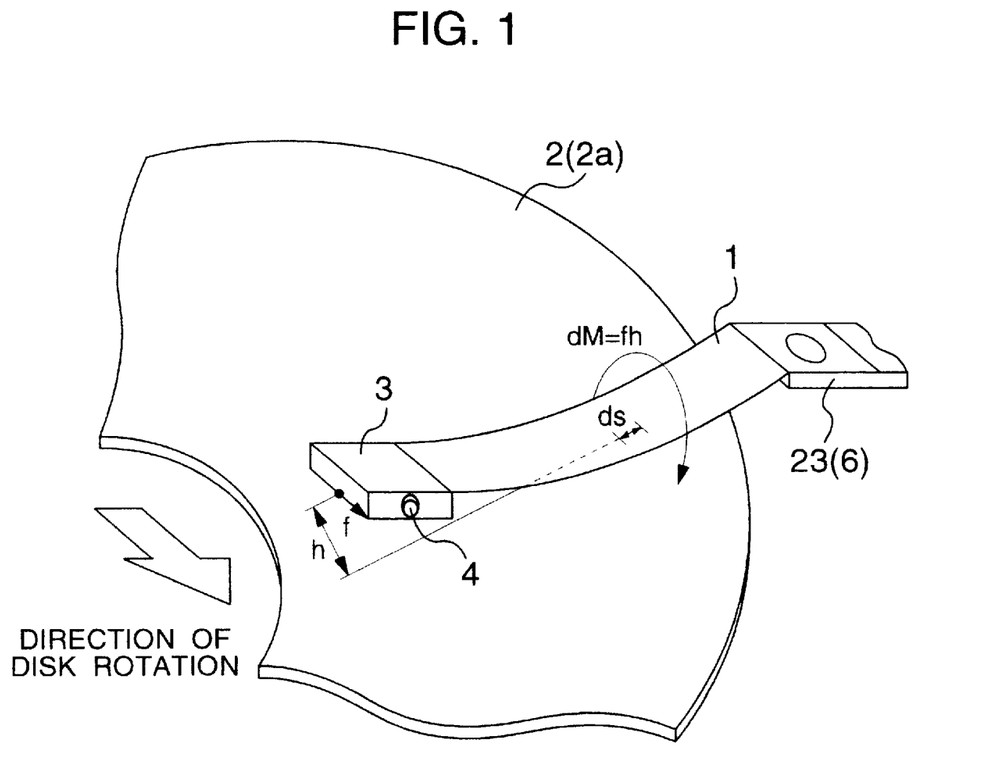
FIG. 1 is a schematic view for explaining an example of a method of assembling a head slider and a function of a magnetic storage device according to the present invention.

In this embodiment, as illustrated in FIG. 1 described below, the load beam 1 for supporting the magnetic head slider 3 supports the magnetic head slider 3 from the direction perpendicular to the tracks concentrically arranged on the magnetic disk 2. The load beam 1 is also curved so that it may be convex with respect to the recording surface 2a of the magnetic disk 2 facing the magnetic head slider 3.

The magnetic head slider 3 is slid on the magnetic disk 2 by a predetermined load. Thus, a moment acting on the magnetic head slider 3 by a friction force between the magnetic disk 2 and the magnetic head slider 3 is exerted in the direction to reduce the friction force.

Referring to FIG. 1, the function and principle of a mounting mechanism of the magnetic head slider 3 of this embodiment will be described in more detail.

In this embodiment, the magnetic head slider 3 is installed on the load beam 1 so that a longitudinal axis of the load beam 1 may cross (or "be generally perpendicular to") a traveling direction of the magnetic head slider 3. In other words, the magnetic head slider 3 is installed on the distal end of the load beam 1 so that a pitch angle may be changed due to a torsion about an axis of a straight line connecting the proximal end and the distal end of the load beam 1. Herein, the proximal end of the load beam 1 indicates a mounting position of the load beam 1 to the actuator 6. The distal end of the load beam 1 indicates the mounting position of the load beam 1 to the magnetic head slider 3. As noted above load beam 1 is also curved so that it may be convex with respect to the magnetic disk 2.

Figure 2:
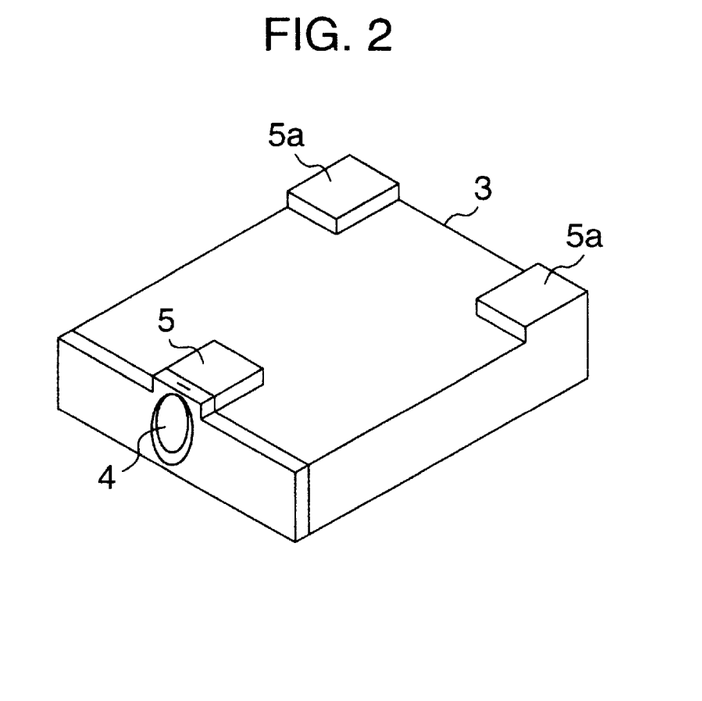
FIG. 2 is a perspective view of an exemplary constitution of the head slider constituting the magnetic storage device according to the present invention.

As illustrated in FIG. 2, an air bearing surface of the magnetic head slider 3 facing the magnetic disk 2 is constituted in the following manner. As an example, on the trailing edge side of an air flow generated by a rotation of the magnetic disk 2, a magnetic head 4 for operating at least one of recording and reproduction of information on the magnetic disk 2 is arranged. A pad is arranged at the position of this magnetic head 4. Pads 5a, are also arranged on the leading edge side of the air flow in such a manner that a distance between the magnetic head 4 and the magnetic disk 2 is difficult to change even if the pitch angle is changed. That is, three pads are arranged on the air bearing surface.

Now, when the magnetic disk 2 is rotated, a friction force f is applied to the magnetic head slider 3. This friction force f allows a moment M to act on a fine portion dS on the load beam 1. Assuming that the distance between a tangent line of the load beam 1 and a point of application of the friction force f in the portion dS is defined as h, an equation, M=fh, is obtained. Therefore, assuming that a total torsion angle of the load beam 1 is defined as θ, the fine portion dS is distorted by Δθ=dSM/GJs. Herein, GJs denotes a torsion stiffness of the load beam 1 in the fine portion dS. An amount of change in the pitch angle of the slider is determined by the total torsion angle θ. The total torsion angle can be determined by integrating Δθ over the total length of the load beam 1, such that $\theta = \int \Delta\theta$.

Assuming that a direction to increase a flying height on the leading edge side of the air is defined as Δθ>0, the fine portion dS is distorted in the direction to increase θ due to the moment M, that is, in the direction of Δθ>0 in FIG. 1. If the load beam 1 is curved convexly with respect to the recording surface 2a of the magnetic disk 2, the portion dS is changed into Δθ>0 due to the moment M on the mounting side of the load beam 1 to the actuator 6. When this curvature is increased up to a constant value or more, an area of Δθ>0 is increased in the load beam 1, and thus the total torsion angle θ becomes positive.

Therefore, when the friction force f is exerted, the pitch angle is increased. As a result, since the friction force f is reduced, it is possible to suppress the edge wear of the magnetic head slider 3, the generation of the self-excited vibration of the suspension and the amplitude of a forced vibration. This curvature of the load beam 1 can be geometrically specified.

Figure 3:
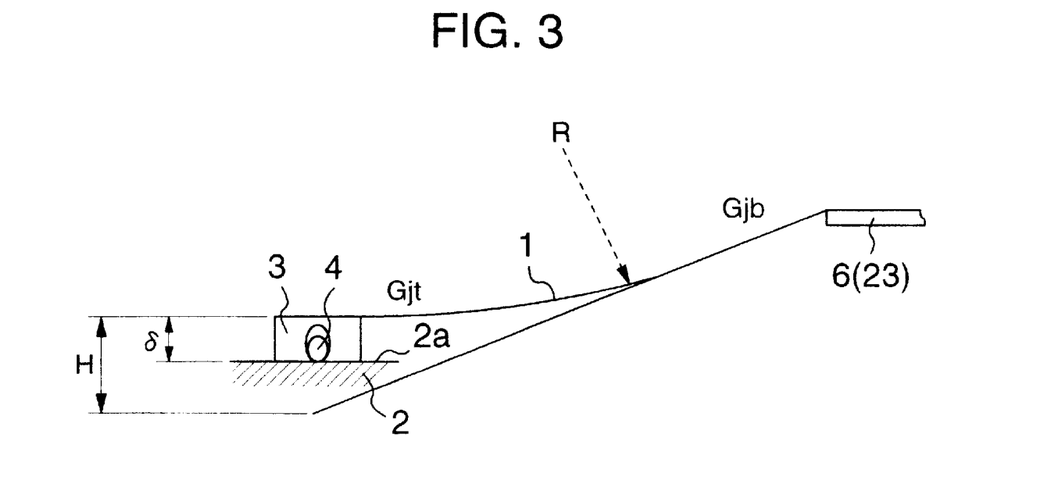
FIG. 3 is a schematic view showing an example of the method of assembling the head slider and the function of the magnetic storage device according to the present invention.

FIG. 3 shows an exemplary shape of the load beam 1 of this embodiment which is curved at a constant curvature (a radius R) and installed in the magnetic disk device. A perpendicular line is drawn from the mounting position of the load beam 1 to the magnetic head slider 3 to the recording surface 2a of the magnetic disk 2. The distance to an intersection of the perpendicular line and the tangent line of the load beam 1 in the mounting position to the actuator 6 is defined as H. A thickness of the magnetic head slider 3 is defined as d. Also, the torsion stiffness in the mounting position of the load beam 1 to the actuator 6 is defined as GJb, and the torsion stiffness in the mounting position of the load beam 1 to the magnetic head slider 3 is defined as GJt. As represented by the following expression (1), $$H \geq \delta \frac{(GJb + GJt)}{GJt}, \qquad (1)$$

if a relationship of the expression (1) is satisfied, a center of rotation of the magnetic head slider 3 in a direction of pitch due to the moment acting on the load beam 1 by the friction force f generated between the magnetic head slider 3 and the magnetic disk 2 is lower than the recording surface 2a of the magnetic disk 2 in height.

Figure 4:
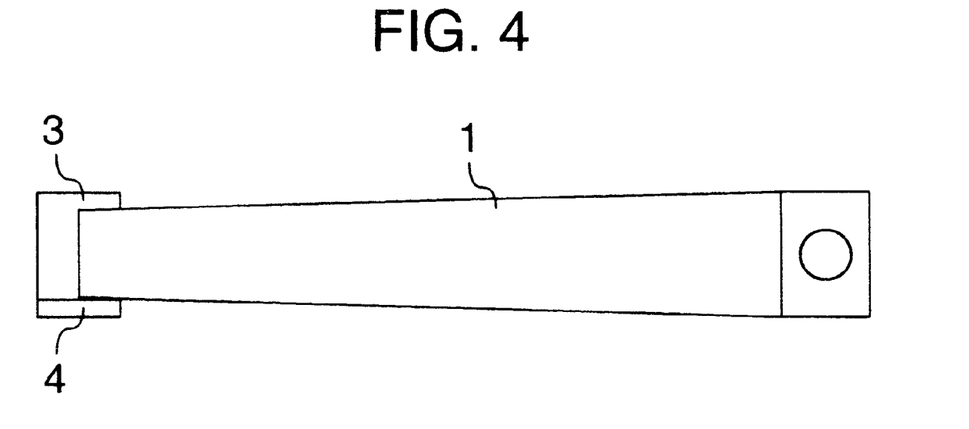
FIG. 4 is a plan view of an exemplary constitution of a load beam constituting the magnetic storage device according to the present invention.
Figure 5:
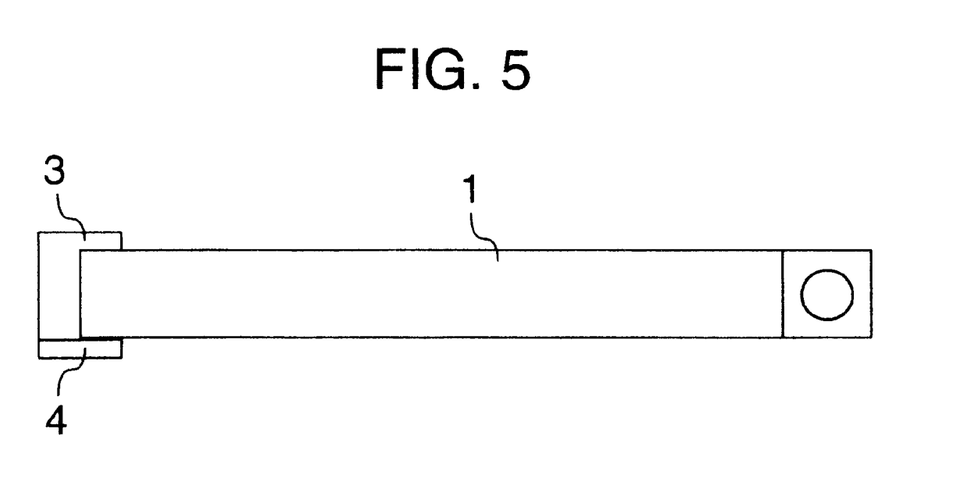
FIG. 5 is a plan view of a modified constitution of the load beam in FIG. 4.

This expression (1) is also applicable to a case in which a width of the load beam 1 is not constant as shown in FIG. 4 and the width of the mounting position to the actuator 6 is different from that of the mounting position to the slider 3. Furthermore, when the load beam 1 is constant in width, length and thickness as shown in FIG. 5, this results in GJb=GJt, and the conditional expression (1) is represented by $H \geq 2\delta$.

Figure 12A:
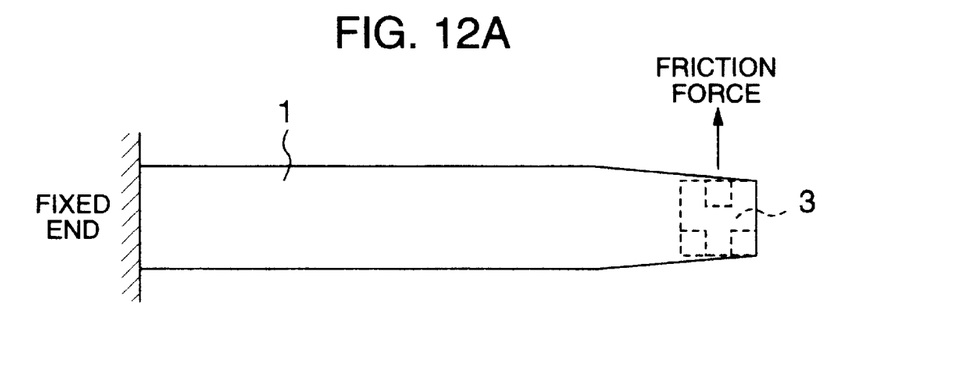
FIGS. 12A and 12B are schematic views for describing an example of the method of assembling the head slider and the function of the magnetic storage device according to the present invention.
Figure 12B:
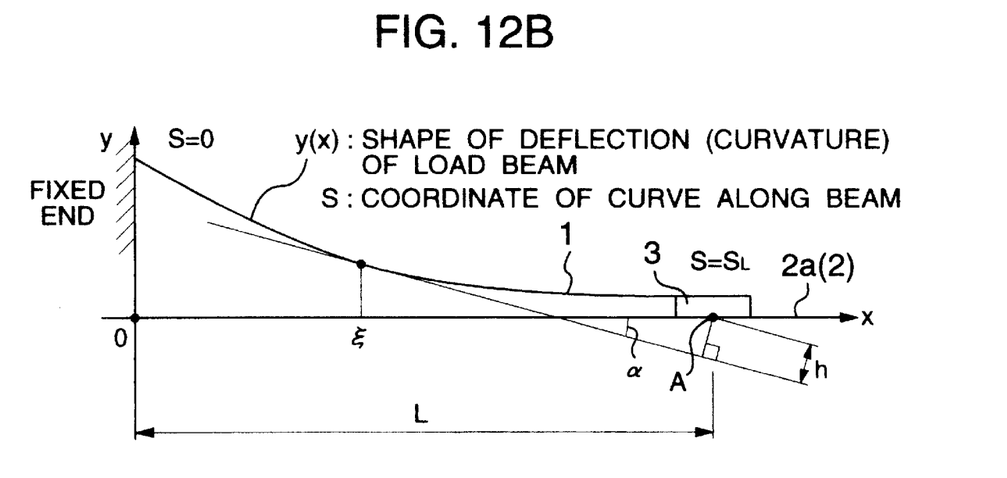

With reference to FIGS. 12A and 12B, an exemplary condition to be included in the shape of curvature of the load beam 1 of an optional shape will be discussed. As illustrated in FIG. 12B, a foot of the perpendicular line drawn from the mounting position of the load beam 1 to the actuator 6, that is, a fixed end to the recording surface 2a of the magnetic disk 2 is defined as an origin O. An x-axis is set in a direction to connect this origin O and a foot A of the perpendicular line drawn from the mounting position of the load beam 1 to the magnetic head slider 3 to the recording surface 2a of the magnetic disk 2.

Then, the distance from the origin O to the foot A is defined as L. As shown in FIG. 12A, f denotes a circumferential component of the friction forces applied to the magnetic head slider at a contact position of the magnetic head slider 3. GJ(x) denotes the torsion stiffness in a direction to generate the torsion due to the friction force f on each point of the load beam 1. y(x) denotes the distance from the recording surface 2a of the magnetic disk 2 to a middle point of the width of the load beam 1 in the direction perpendicular to the straight line connecting the mounting position of the load beam 1 to the actuator 6 and the mounting position of the load beam 1 to the magnetic head slider 3, that is, a shape of deflection (curvature) of the load beam 1. Moreover, S denotes a coordinate of curvature along the load beam 1, whereby S=0 on the origin O and S=SL on the foot A.

At this time, assuming that $h(\xi)$ denotes the distance between the tangent line of y(x) on a point $\xi$ of the load beam 1 and the point A on which the friction force f acts and $\alpha(\xi)$ denotes the angle formed by the tangent line and the x-axis, a moment $M(\xi)$ acting on the position on the point $\xi$ of the load beam 1 can be obtained by the following expressions (2) and (3).

$$M(\xi) = h(\xi) \cdot f \quad (2)$$

$$h(\xi) = -\left[\frac{dy}{dx}\bigg|_{x=\xi}(L-\xi) + y(\xi)\right]\cos\alpha(\xi) \quad (3)$$

In addition, from a definition of the tangent line, cos α is represented by the following expression (4).

$$\cos\alpha = \frac{1}{\sqrt{1+\left(\frac{dy}{dx}\right)^2}} \quad (4)$$

Assuming that GJ(ξ) denotes the torsion stiffness of the load beam 1 on the point ξ, torsion φ(ξ) the torsion angle per unit length) of the load beam 1 on the point x is represented by the following expression (5).

$$\phi(\xi) = \frac{M(\xi)}{GJ(\xi)} \quad (5)$$

Therefore, the total torsion angle q of the load beam 1 about the x-axis at the fixing position of the magnetic head slider 3 on the distal end of the load beam 1 is represented by the following expression (6).

$$\theta = \int_O^{SL} \frac{M(\xi)}{GJ(\xi)}\cos\alpha(\xi)ds = \int_O^L \frac{M(x)}{GJ(x)}dx \quad (6)$$

When this expression is changed in consideration of the above-described expressions (2) and (3), the following expression (7) is represented.

$$\theta = -\int_O^L \frac{f}{GJ(x)}\left[\frac{dy}{dx}(L-x)+y\right]\frac{1}{\sqrt{1+\left(\frac{dy}{dx}\right)^2}}dx \quad (7)$$

For a variation in the friction force f, θ≧0 is the condition of a displacement of rotary movement of the magnetic head slider 3 in a direction of the pitch angle for canceling the variation and for constantly keeping an attitude of the magnetic head slider 3. Therefore, y(x) indicating the shape of deflection (curvature) of the load beam 1 satisfies the following expression (8).

$$-\int_O^L \frac{f}{GJ(x)}\left[\frac{dy}{dx}(L-x)+y\right]\frac{1}{\sqrt{1+\left(\frac{dy}{dx}\right)^2}} \geq 0 \quad (8)$$

That is, by the use of the load beam 1 having an optional shape of curvature y(x) satisfying this expression (8), objects of the present invention can be achieved.

FIGS. 6–9 show simulation results under various conditions. The used load beam 1 is made of an SUS (stainless steel) material, for example. The load beam 1 is 10 mm in length, 3 mm in width and 20 mm in thickness. The magnetic head slider 3 is 0.2 mm in thickness.

Figure 6:
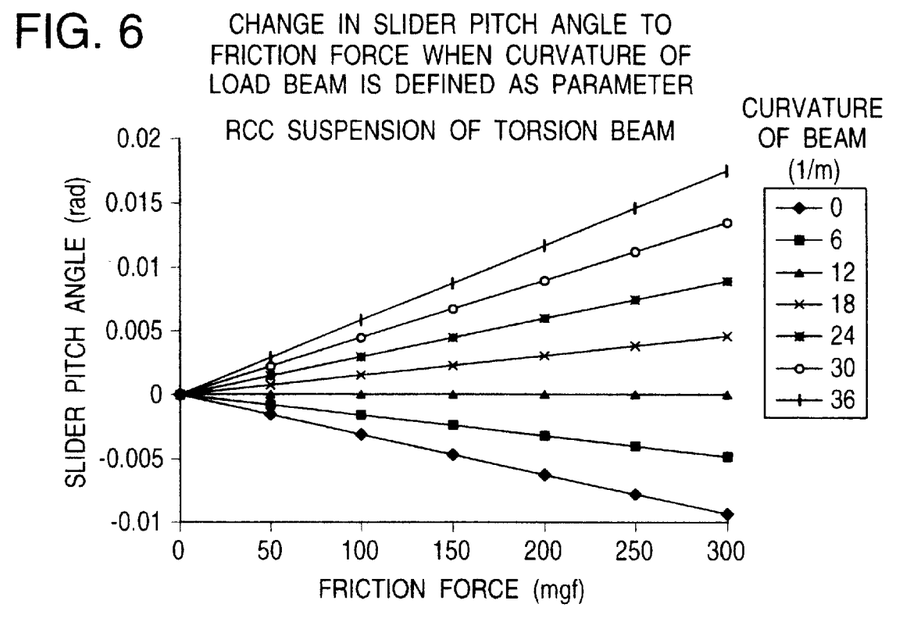
FIG. 6 is a graph for describing an example of the method of assembling the head slider and the function of the magnetic storage device according to the present invention.
Figure 7:
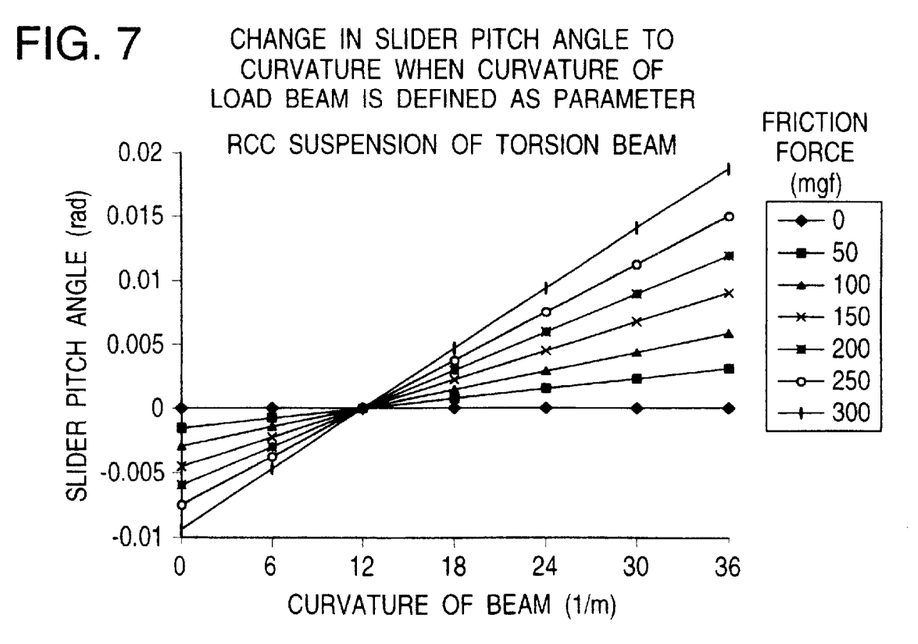
FIG. 7 is a graph for describing an example of the method of assembling the head slider and the function of the magnetic storage device according to the present invention.

In FIGS. 6 and 7, the load applied to the magnetic head slider 3 is 0 mgf, that is, the slider 3 is unloaded, and the load beam 1 is curved so that it may initially have a constant curvature. Namely, in FIGS. 6 and 7, assuming that a radius of curvature is defined as R m, a curvature (1/R) is defined as a parameter. The ordinate represents a slider pitch angle, and the abscissa represents the friction force f in FIG. 6 and the curvature (1/R) of the load beam 1 in FIG. 7.

From FIGS. 6 and 7, it is seen that the slider pitch angle is changed when the friction force f between the magnetic head slider 3 and the magnetic disk 2 is changed. When the curvature of the load beam 1 is 12 m$^{-1}$ (the radius of curvature is 1/12 m), even if the friction force is increased, the slider pitch angle is not changed, and thus the attitude of the magnetic head slider 3 is maintained in a stable manner. When the curvature is more than 12 m$^{-1}$ (the radius of curvature is less than 1/12 m), the friction force f is increased, the pitch angle is increased, and thus the friction force f is canceled and reduced.

If the curvature is less than 12 m$^{-1}$ (the radius of curvature is more than 1/12 m), the pitch angle becomes negative with the increase of the friction force f. Thus, the flying height of the magnetic head slider 3 on the trailing edge side of the air is higher than the flying height on the leading edge side of the air. As a result, the magnetic head slider 3 "almost falls forward" on the leading edge side of the air, and thus the friction force f is further increased.

Therefore, if the curvature of the load beam 1 is set at 12 m$^{-1}$ or more (the radius of curvature is set at 1/12 m or less), when the friction force f between the magnetic head slider 3 and the magnetic disk 2 is changed, the slider pitch angle is not changed or is increased, whereby it is possible to suppress the edge wear of the magnetic head slider 3 on the leading edge side of the air, the generation of the self-excited vibration of the suspension such as the load beam 1 and the actuator 6 and the generation of the forced vibration of the suspension due to the varying friction force.

Figure 8:
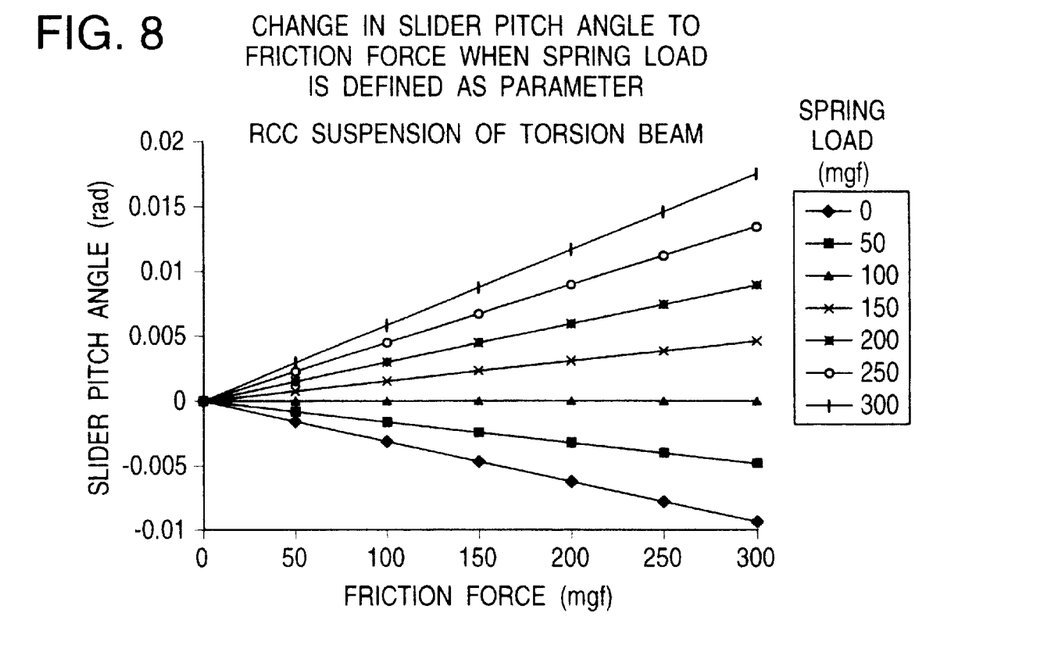
FIG. 8 is a graph for describing an example of the method of assembling the head slider and the function of the magnetic storage device according to the present invention.
Figure 9:
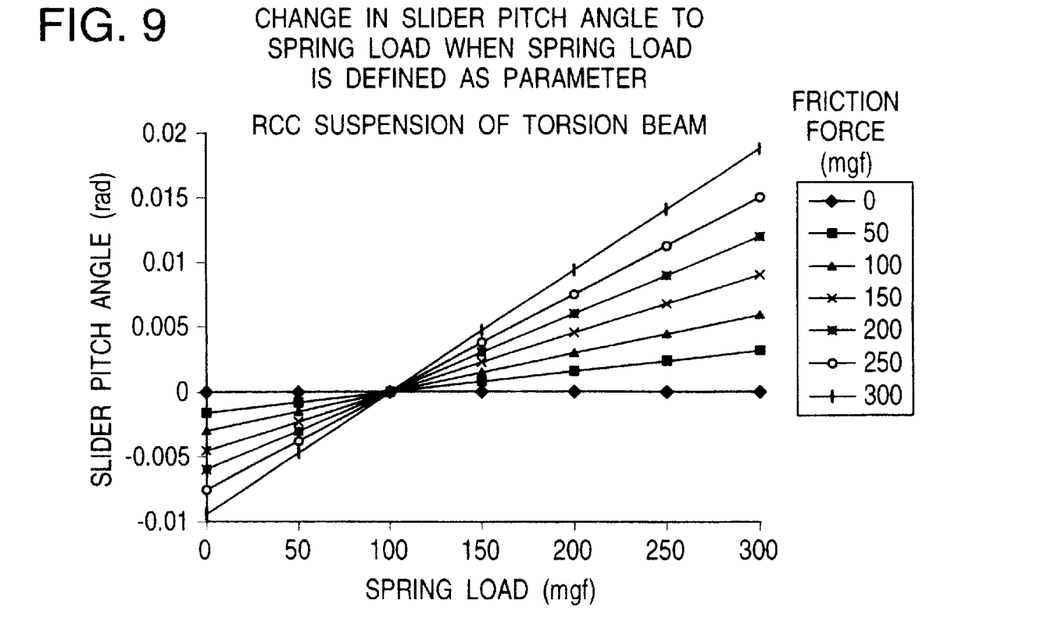
FIG. 9 is a graph for describing an example of the method of assembling the head slider and the function of the magnetic storage device according to the present invention.

In FIGS. 8 and 9, there is shown simulation result in which the load beam 1 is not initially curved and the load beam 1 is curved/deformed into a desired shape by a reaction force when a predetermined load is applied to the magnetic head slider 3 during an assembly or the like.

When the load is 0 gf, the load beam 1 is not curved. The load to the magnetic head slider 3 is set as a parameter, and the curvature corresponding to the load is given to the load beam 1. The ordinate represents the slider pitch angle, and the abscissa represents the friction force in FIG. 8 and a spring load to the magnetic head slider 3 (the reaction force from the magnetic head slider 3) in FIG. 9.

From FIGS. 8 and 9, it is seen that the slider pitch angle is changed when the friction force f between the magnetic head slider 3 and the magnetic disk 2 is changed. When the spring load is 100 mgf, even if the friction force f is increased, the pitch angle is not changed, and thus the attitude of the magnetic head slider 3 is maintained in a stable manner. When the spring load is more than 100 mgf, if the friction force f is increased, the pitch angle is increased, and the friction force f is therefore canceled and reduced.

When the spring load is less than 100 mgf, the pitch angle becomes negative with the increase of the friction force f. Thus, the flying height of the magnetic head slider 3 on the trailing edge side of the air is higher than the flying height on the leading edge side of the air. As a result, the magnetic head slider 3 "almost falls forward" on the leading edge side of the air, and thus the friction force f is further increased.

Therefore, if the spring load is set at 100 mgf or more, when the friction force f between the magnetic head slider 3 and the magnetic disk 2 is changed, the slider pitch angle is not changed or is increased, whereby it is possible to suppress the edge wear of the magnetic head slider 3 on the leading edge side of the air, the generation of the self-excited vibration of the suspension and the generation of the forced vibration of the suspension due to the varying friction force.

Moreover, when the load beam 1 is unloaded and initially curved at a constant curvature, the load beam 1 is allowed to have some load to the slider. Thus, when the assembly is completed, the load beam 1 is totally adapted so that the center of rotation of the magnetic head slider 3 in the direction of pitch due to the moment acting on the load beam 1 may be positioned lower than the recording surface 2a of the magnetic disk 2. Therefore, when the friction force f between the magnetic head slider 3 and the magnetic disk 2 is exerted, the moment is adapted so that it may be oriented in the direction to increase the pitch angle. In such a manner, it is possible to suppress the edge wear of the magnetic head slider 3 on the leading edge side of the air, the generation of the self-excited vibration of the suspension and the generation of the forced vibration of the suspension due to the varying friction force.

From the result of FIGS. 6–9 as set forth above, it is seen that, for example, when the load beam 1 has the present shape and material, the shape of deflection (curvature) of the assembled load beam 1 is merely set so that the curvature (1/R) may be more than 12 m$^{-1}$.

Figure 10:
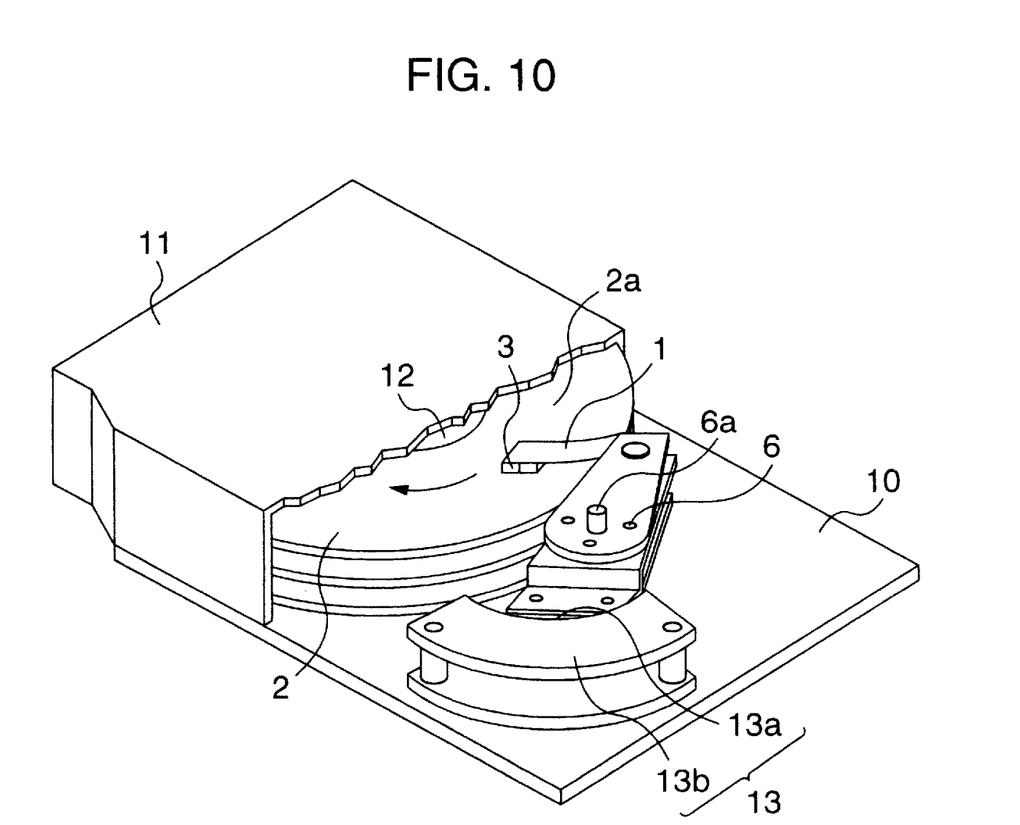
FIG. 10 is a partially broken-away perspective view of an exemplary constitution of the magnetic storage device according to the present invention.
Figure 11:
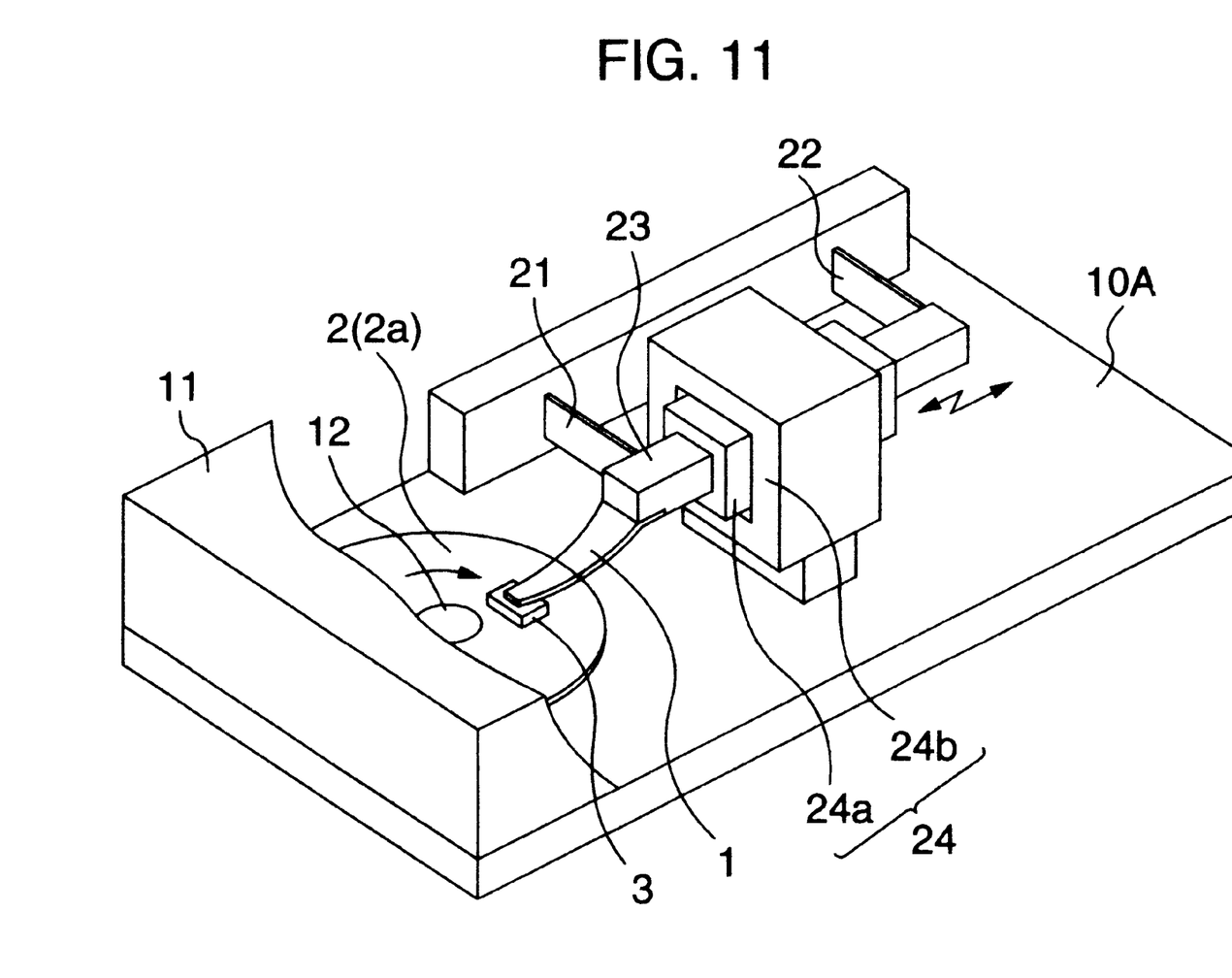
FIG. 11 is a partially broken-away perspective view of another exemplary constitution of the magnetic storage device according to the present invention.

The magnetic disk device is not limited to the constitution using the rotary type actuator illustrated in FIG. 10 but may be constituted by the use of a linear type actuator illustrated in FIG. 11.

That is, in the constitution illustrated in FIG. 11, a linear type actuator 23 is supported by two leaf springs 21 and 22 on the side of a base 10A so that its axial direction may be parallel to a radial direction of the magnetic disk 2. A voice coil 24a is fixed in the actuator 23. A yoke 24b such as a permanent magnet fixed on the side of the base 10A is arranged so that it may axially surround this voice coil 24a. A linear type voice coil motor 24 is constituted by the voice coil 24a and the yoke 24b.

The proximal end of the load beam 1, having the magnetic head slider 3 fixed on the end thereof, is fixed on the end of the actuator 23 facing the magnetic disk 2. The magnetic head slider 3 is supported so that it may be pressed against the recording surface 2a of the magnetic disk 2 by a desired load.

This assembled load beam 1 is curved convexly on the side of the magnetic disk 2 so that the above-mentioned expressions (1), (8) and various necessary conditions obtained from the simulation results illustrated in FIGS. 6–9 may be satisfied.

Then, by controlling the direction and the electric current flowing through the voice coil 24a of the voice coil motor 24, the actuator 23 supported by the leaf springs 21 and 22 makes a reciprocally parallel motion, whose displacement direction, displacement velocity and amount of displacement are controlled with high precision, in the radial direction of the magnetic disk 2. Thus, the magnetic head slider 3 supported by the actuator 23 through the load beam 1 is displaced in the radial direction of the magnetic disk 2. For example, the magnetic head slider 3 makes a movement (seek) among a plurality of tracks concentrically arranged on the recording surface 2a of the magnetic disk 2 and takes action (following) for following a specific track.

In FIG. 11, since the displacement of the reciprocal motion of the linear type actuator 23 is supported by an elastic deformation of the leaf springs 21 and 22, there is no element requiring a lubrication such as a bearing. Therefore, the enclosed space for housing the magnetic disk 2, the magnetic head slider 3 or the like is not contaminated by gas or the like generated from a lubricating oil, and thus reliability can be further improved.

As described above, according to the method of assembling the magnetic head slider and the magnetic disk device of this embodiment, there is provided a simple constitution in which the load beam 1 for supporting the magnetic head slider 3 and for bringing the slider 3 into contact with the magnetic disk 2 by a desired load is curved convexly with respect to the magnetic disk 2 when the assembly is completed. By this simple constitution, the center of rotation of the displacement of rotary movement of the magnetic head slider 3 in the direction of pitch due to the friction force f generated between the rotating magnetic disk 2 and the magnetic head slider 3 can be positioned at a height of the recording surface 2a of the magnetic disk 2 or lower. Therefore, even if the friction force f is generated or increased, the attitude of the magnetic head slider 3, that is, the space between the magnetic head 4 and the recording surface 2a can be constantly maintained, or the magnetic head slider 3 can be rotationally displaced about the longitudinal axis of the load beam 1 or the like in the direction to cancel the increase of the friction force f.

As a result, an occurrence of a phenomenon, in which the increase of the friction force f further promotes the increase of the friction force f, is prevented. It is thus possible to suppress the edge wear of the magnetic head slider 3 on the leading edge side of the air, the generation of the self-excited vibration of the suspension such as the actuator 6 (23) and the load beam 1, and the generation of the forced vibration of the suspension due to the varying friction force caused by a non-uniform distribution of the friction force on the recording surface 2a or the like.

Consequently, for the magnetic disk device, it is possible to achieve both an improvement of areal density and operation reliability by reducing the space between the magnetic head 4 and the recording surface 2a by the use of the contact type magnetic head slider 3 and an extension of lifetime of the magnetic disk 2, the magnetic head slider 3 or the like.

Although the present invention is specifically described above on the basis of the embodiment, the present invention is not limited to the above-mentioned embodiment. Various changes can be made without departing from the subject matter of the present invention.

For example, although, in the above-mentioned embodiment, the magnetic head slider mounting the magnetic head and the magnetic disk device using it have been described as an example of the head slider and the magnetic storage device, the present invention can be widely applied to magnetic storage devices or the like including a general contact type or semi-contact type head slider mounting an optional transducer.

Furthermore, the shape of the load beam is not limited to a smoothly curved shape illustrated in the embodiment but may be a bent shape.

According to the method of assembling the head slider of the present invention, it is possible to obtain an effect capable of preventing abnormal wear, self-excited vibration, and forced vibration due to the friction of the contact type head slider and the rotational type storage medium, without complicating the suspension in structure and increasing the suspension in size.

According to the method of assembling the head slider of the present invention, it is possible to obtain another effect capable of constantly keeping the positional relationship between the transducer mounted in the contact type head slider and the rotational type storage medium and of achieving the improvement of areal density and reliability without the influence of the friction of the contact type head slider and the rotational type storage medium.

According to the magnetic storage device of the present invention, it is possible to obtain still another effect capable of preventing the abnormal wear, self-excited vibration, and forced vibration due to the friction of the contact type head slider and the rotational type storage medium, without complicating the suspension in structure and increasing the suspension in size.

According to the magnetic storage device of the present invention, it is possible to obtain a further effect capable of constantly keeping the positional relationship between the transducer mounted in the contact type head slider and the rotational type storage medium, and of achieving the improvement of areal density and reliability, without the influence of the friction of the contact type head slider and the rotational type storage medium.

What is claimed is:

1. A magnetic storage device comprising:
    a rotational type storage medium;
    a head slider to which a transducer for operating at least one of recording and reproduction of information on said rotational type storage medium is mounted, said head slider being brought into contact with said rotational type storage medium during recording and reproduction of information;
    a load beam supporting said head slider and applying a load to the slider;
    an actuator to which the load beam is mounted; and
    a positioning mechanism for supporting said head slider and for positioning said head slider on said rotational type storage medium,
    wherein said head slider is arranged so that a line including the mounting position of said load beam to said actuator and the mounting position of said load beam to said head slider is generally perpendicular to a direction of relative motion between said rotational type storage medium and said head slider during recording and reproduction; and
    wherein said load beam is convex with respect to said rotational type storage medium.

2. The device according to claim 1, wherein said load beam previously has a predetermined curved shape in a state that said head slider has no contact with said rotational type storage medium and is unloaded so that said load beam is convex with respect to said rotational type storage medium.

3. The device according to claim 1, wherein said load beam has a curved shape so as to be convex with respect to said rotational type storage medium by the reaction force of a load applied to said head slider in order to bring said head slider into contact with said rotational type storage medium.

4. The device according to claim 1, wherein said load beam previously has a curved shape in a state that said head slider has no contact with said rotational type storage medium and is unloaded, and said load beam has a curved shape so as to be convex with respect to said rotational type storage medium by the reaction force of a load applied to said head slider in order to bring said head slider into contact with said rotational type storage medium.

5. The device according to claim 1, wherein said load beam has a shape satisfying the following expression:

$$-\int_0^L \frac{f}{GJ(x)}\left[\frac{dy}{dx}(L-x)+y\right]\frac{1}{\sqrt{1+\left(\frac{dy}{dx}\right)^2}}dx \geq 0$$

wherein an origin O is defined as a foot of a perpendicular line drawn from the mounting position of said load beam to said actuator onto a plane of said rotational type storage medium, an x-axis is defined as extending in a direction to connect said origin O and a foot A of a perpendicular line drawn from the mounting position of said load beam to said head slider onto the plane of said rotational type storage medium, L denotes the distance from said origin O to said foot A, f denotes a circumferential component of the friction forces applied to said head slider at a contact position of said head slider to said rotational type storage medium, GJ(x) denotes the torsion stiffness in a direction of torsion generated due to said f on each point of said load beam, and y(x) denotes the distance from the plane of said rotational type storage medium to a middle point of a width in the direction perpendicular to a straight line connecting the mounting position of said load beam to said actuator and the mounting position of said load beam to said head slider 6. The device according to claim 1, wherein said load beam has a convex curve toward said rotational type storage medium.

7. The device according to claim 6, wherein said load beam is continuously convexly curved toward said rotational type storage medium from said mounting position to the actuator to said mounting position to the head slider.

8. The device according to claim 1, wherein said load beam has a convex bend toward said rotational type storage medium.

* * * * *